Sept. 15, 1964     F. W. CHANDLER     3,148,873
WORK HOLDING DEVICE FOR PIPE FITTING OR THE LIKE
Filed Sept. 27, 1962     2 Sheets-Sheet 1
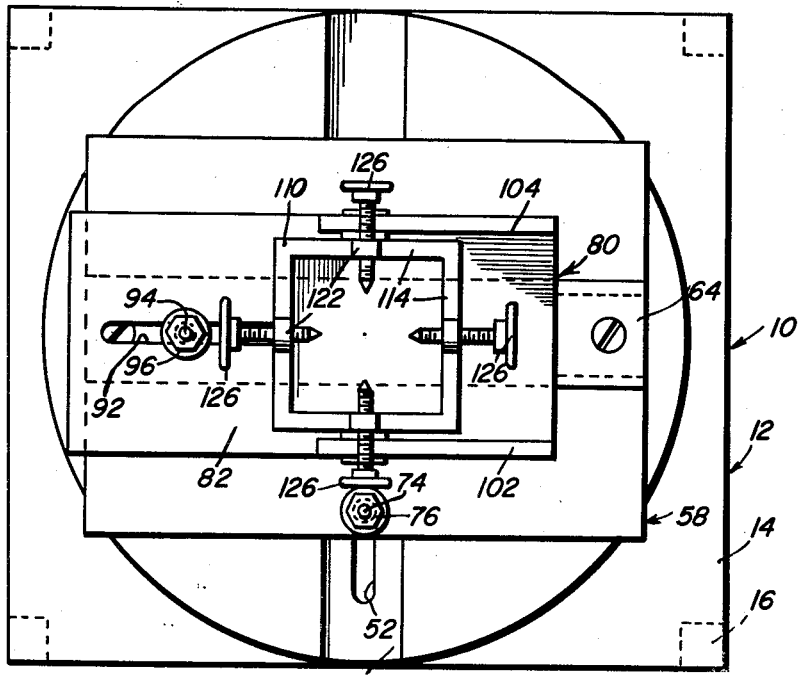
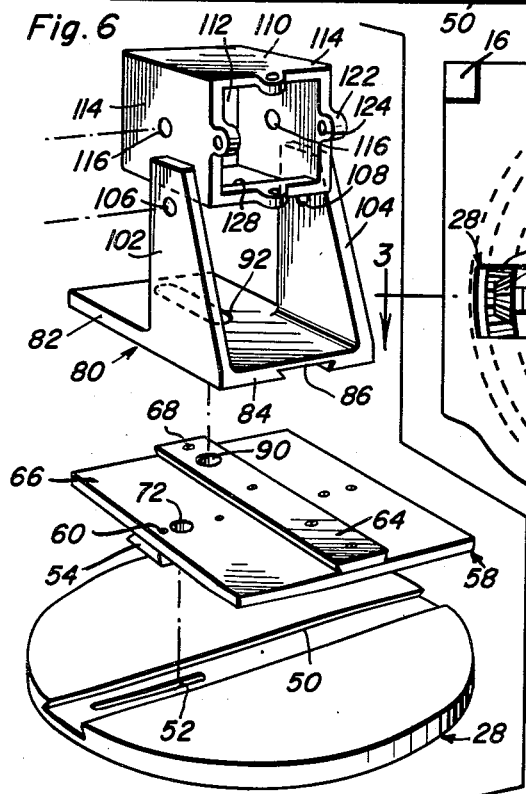
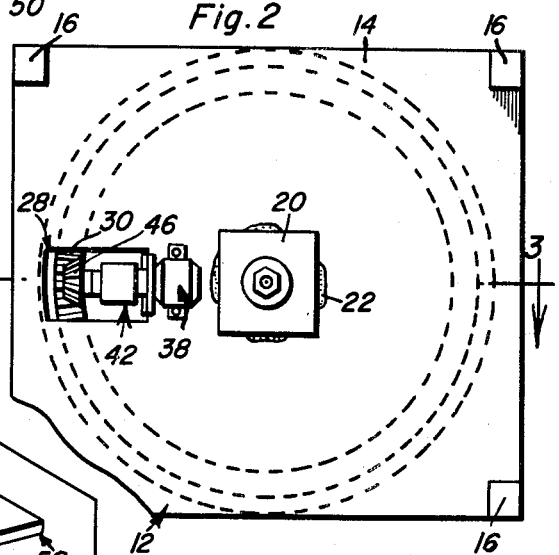
Fred W. Chandler
INVENTOR.

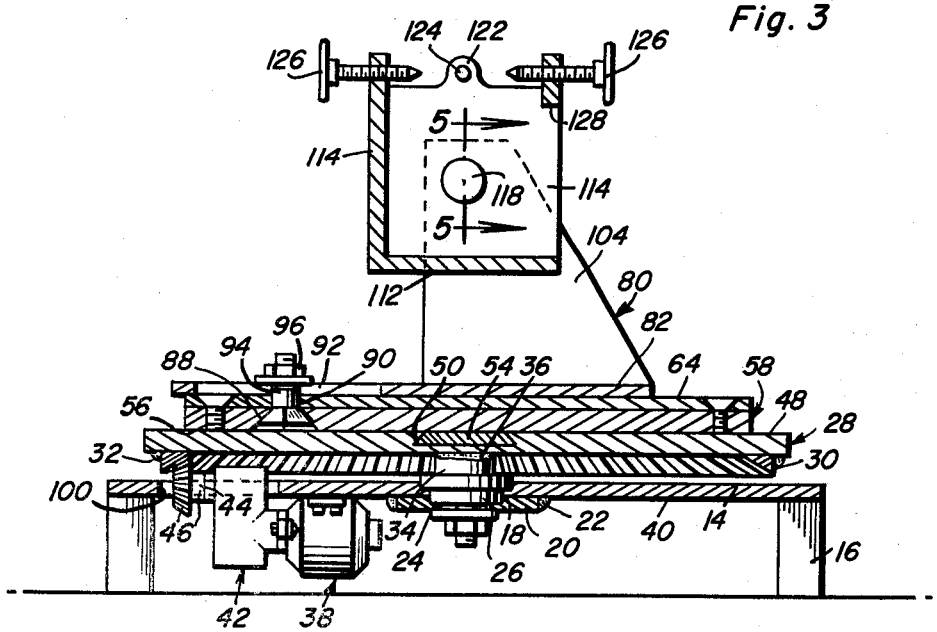
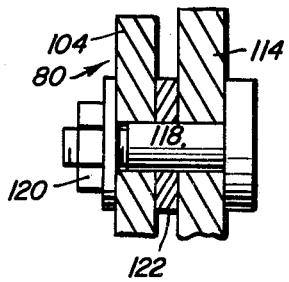
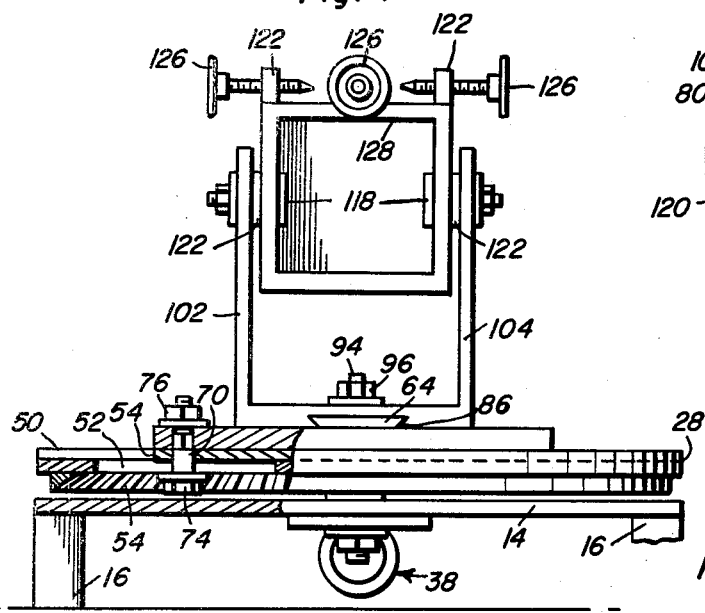
Fred W. Chandler
INVENTOR.

United States Patent Office 3,148,873
Patented Sept. 15, 1964

3,148,873
WORK HOLDING DEVICE FOR PIPE FITTING
OR THE LIKE
Fred W. Chandler, 202 S. 3rd St., Highlands, Tex.
Filed Sept. 27, 1962, Ser. No. 226,599
9 Claims. (Cl. 269—71)

This invention relates to a novel and useful work holding device and more specifically to a jig which may be utilized to reclaim flanges, 90° L, 45° L and other pipe fittings of assorted sizes.

The work holding device includes a jig which is supported for rotation about two mutually perpendicular axes and also for adjustable shifting laterally of one of the aforementioned axes in mutually perpendicular planes extending generally paralleling that axis. The jig of the work holding device is removable and it is to be understood that it may be constructed of different sizes to accommodate various sizes of pipe fittings.

The main object of this invention is to provide a work holding device capable of supporting a workpiece for rotation about a pair of axes disposed at right angles relative to each other while enabling the workpiece to be shifted laterally of one of the axes about which it is rotated through a pair of planes disposed at right angles relative to each other and extending along that one axis.

A further object of this invention, in accordance with the immediately preceding object, is to provide a work holding device including a jig for holding the workpiece which is removably supported on the work holding device in order that it may be replaced with jigs of different sizes.

Yet another object of this invention is to provide a work holding device including means by which the work holding jig may be rotated about one of its axes of rotation by means of any suitable form of power supply.

A final object to be specifically enumerated herein is to provide a work holding device in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the work holding device;

FIGURE 2 is a fragmentary bottom plan view of the work holding device upon somewhat of a reduced scale;

FIGURE 3 is an enlarged vertical sectional view taken substantially upon the plane indicated by the section line 3—3 of FIGURE 2;

FIGURE 4 is a fragmentary side elevational view of the work holding device shown with portions thereof being broken away and shown in section;

FIGURE 5 is an enlarged fragmentary vertical sectional view taken substantially upon the plane indicated by the section line 5—5 of FIGURE 3; and FIGURE 6 is an exploded perspective view of the movable portions of the work holding device.

Referring more specifically to the drawings the numeral 10 generally designates the work holding device of the instant invention and it may be seen to include a base generally referred to by the reference numeral 12.

The base 12 includes a platform 14 having a plurality of support legs 16. The platform 14 is centrally apertured as at 18 and a bottom plate 20 is secured across the lower end of the aperture 18 in any convenient manner such as by welding 22 and is also suitably apertured as at 24.

A thrust bearing assembly 26 is seated within the aperture 18 and retained therein by means of the bottom plate 20.

A generally circular and horizontal mounting table referred to in general by the reference numeral 28 is provided and has a ring gear 30 secured to its undersurface in any convenient manner such as by welding 32. A depending spindle 34 is secured to the undersurface of the mounting table 28 in any convenient manner such as by welding 36 and has its lower end rotatably received in and secured through the thrust bearing assembly 26.

An electric motor generally referred to by the reference numeral 38 is secured to the undersurface 40 of the platform 14 and includes a drive shaft (not shown) which is operatively connected to a gear reduction assembly generally referred to by the reference numeral 42. The gear reduction assembly 42 includes an output shaft 44 on which there is mounted a bevel gear 46 and the bevel gear 46 is meshed with the ring gear 30 whereby the mounting table 28 may be rotated about the longitudinal axis of the spindle 34.

The upper surface 48 of the mounting table 28 has a dovetailed groove 50 formed therein which extends transversely across the mounting table 28. The mounting table 28 also has a slot 52 formed therein which extends longitudinally of the groove 50. An elongated guide member 54 which is dovetailed in cross section is secured to the undersurface 56 of a generally horizontal mounting plate generally referred to by the reference numeral 58 by means of suitable fasteners 60. In addition, the mounting plate 58 has a second elongated guide member 64 secured to its upper surface 66 by means of suitable fasteners 68. The guide members 54 and 64 are dovetailed in cross section and it may be seen that the guide member 54 has a bore 70 formed therethrough which is registered with the slot 52 and that a bore 72 is formed through the mounting plate 58 in registry with the bore 70. An elongated fastener 74 is secured through the registered bores 70 and 72 and the slot 52 by means of a threaded nut 76.

A bifurcated mount generally referred to by the reference numeral 80 is provided and includes a base portion 82 whose lower surface 84 has a dovetailed groove 86 formed therein which extends transversely across the base portion 82. The guide member 64 is snugly and slidably received within the groove 86 as the guide member 54 is snugly and slidably received within the groove 50 and the mounting plate 58 has a bore 88 formed therein which is registered with a bore 90 formed through the guide member 64. The bores 88 and 90 are registered with a slot 92 formed through the base portion 82 and which extends longitudinally of the groove 86. A fastener 94 is secured through the aligned bores 88 and 90 and the slot 92 by means of a threaded nut 96. Accordingly, it may be seen that the mounting plate 58 may be shifted laterally of the axis of rotation of the mounting table 28 and secured in adjusted shifted positions by means of the fastener 74. Additionally, the bifurcated mount may also be shifted laterally of the axis of rotation of the mounting table 28 and secured in adjusted shifted positions by means of the fastener 94. It will be noted that the guide members 54 and 64 extend in mutually perpendicular planes paralleling the axis of rotation of the mounting table 28.

An opening 100 is formed in the platform 14 for receiving the gear reduction assembly 42 and the bevel gear 46. Therefore, it may be seen that the electric motor 38 may be utilized to rotate the mounting table 28 about the longitudinal axis of the spindle 34.

The bifurcated mount 80 includes a pair of upstanding furcations 102 and 104 which are provided with aligned bores 106 and 108 respectively. A jig generally referred to by the reference numeral 110 is provided and comprises a generally rectangular and hollow housing. The housing 110 includes a bottom wall 112 which interconnects the lower ends of four side walls 114. One pair of opposite side walls 114 are provided with bores 116 which are registrable with the bores 106 and 108 formed in the furcations 102 and 104 and from FIGURE 5 of the drawings it may be seen that axle pins 118 are secured through corresponding pairs of the bores 116 and 106 and 108 by means of a threaded nut 120. A washer 122 is disposed between the confronting surfaces of the furcations 102 and 104 and the corresponding sides 114 of the housing 110. By tightening the threaded nuts 120, the frictional engagement between the opposite sides of the washers 122 and the corresponding confronting surfaces of the furcations and sides of the housing 110 may be increased in order that the housing 110 may be retained in adjusted rotated positions relative to the bifurcated mount 80.

It may be seen from FIGURES 1, 3 and 6 of the drawings that each of the sides 114 is provided with a mounting lug 122 which has a threaded bore 124 formed therethrough. A setscrew 126 is threadedly engaged in each of the bores 124. Still further, from FIGURES 3 and 6 of the drawings it may be seen that one of the side walls 114 has a large opening 128 formed therein.

In operation, any type of cutting, welding or refacing tool may be rigidly supported from the platform 14. The workpiece, such as a pipe L, may have one end portion secured between the adjacent ends of the setscrews 126. Then, the housing 110, the mounting plate 58 and the bifurcated mount 80 may be properly adjustably positioned in order to rotate a selected portion of the workpiece about any axis. If a pipe L is to be supported from the housing 110, one leg of the L may be engaged between the adjacent ends of the setscrews 126 while the other leg of the L projects outwardly through the opening 128.

While the work holding device 10 has been primarily designed for use in reclaiming various types of pipe fittings, it is to be appreciated that many other different workpieces may be fixedly supported from the housing 110 and rotated about any axis in order that a given operation may be performed on the workpiece.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A work holding device comprising a base, a generally horizontal mounting table supported from said base for rotation about a fixed upright axis, a generally horizontal mounting plate, means mounting said plate on said table for manually adjustable, guided rectilinear and generally horizontal movement relative to said table, a mount, means mounting said mount on said mounting plate for manually adjustable, guided rectilinear and generally horizontal movement normal to the path of movement of said plate relative to said table, and a jig pivotally supported from said mount for rotation about a generally horizontal axis and including means adapted to removably secure a workpiece to said jig.

2. The combination of claim 1 wherein said jig defines a recess adapted to receive said workpiece and, the last-mentioned means constituting clamp means adapted to clampingly secure at least a portion of said workpiece within said recess.

3. The combination of claim 1 wherein said means mounting said plate on said table comprises a dovetail projection and groove connection between said plate and said table.

4. The combination of claim 1 wherein said means mounting said mount on said plate comprises a dovetail projection and groove connection between said plate and said mount.

5. The combination of claim 1 including drive means carried by said base and drivingly connected to said table for rotating the latter relative to the base.

6. The combination of claim 1 wherein the first mentioned mounting means includes means releasably retaining said plate in adjusted shifted positions relative to said table.

7. The combination of claim 1 wherein the second mentioned mounting means includes means releasably retaining said mount in adjusted shifted positions relative to said plate.

8. The combination of claim 1 including means releasably retaining said jig in adjusted rotated positions relative to said mount.

9. The combination of claim 1 including means retaining said plate and mount in adjusted shifted positions relative to said table and plate respectively and including means for variably increasing the frictional engagement between said plate and said table and said plate and said mount respectively.

References Cited in the file of this patent

UNITED STATES PATENTS

| | | |
|---|---|---|
| 587,537 | Norman | Aug. 3, 1897 |
| 1,384,163 | Smith et al. | July 12, 1921 |
| 2,595,137 | Hagopian | Apr. 29, 1952 |
| 2,957,362 | Kelm | Oct. 25, 1960 |